(12) United States Patent
McClure et al.

(10) Patent No.: US 7,410,081 B2
(45) Date of Patent: Aug. 12, 2008

(54) SUPPORT STRUCTURE FOR A SPARE TIRE ON A VEHICLE

(75) Inventors: Kerry Stephen McClure, Dublin, OH (US); Brian David Shanfeld, Powell, OH (US); David Michael Edwards, Marysville, OH (US)

(73) Assignee: Honda Motor Company, Ltd., Tokyo (JP)

( * ) Notice: Subject to any disclaimer, the term of this patent is extended or adjusted under 35 U.S.C. 154(b) by 268 days.

(21) Appl. No.: 10/663,889

(22) Filed: Sep. 16, 2003

(65) Prior Publication Data

US 2005/0056667 A1 Mar. 17, 2005

(51) Int. Cl.
B62D 43/06 (2006.01)

(52) U.S. Cl. ................. 224/403; 224/42.21; 296/37.14; 296/37.2

(58) Field of Classification Search ................ 224/42.2, 224/42.12, 42.14, 42.21, 42.23, 42.29, 281, 224/518, 538, 403, 404; 296/37.14, 37.2, 296/182.1, 184.1, 37.6; 312/323
See application file for complete search history.

(56) References Cited

U.S. PATENT DOCUMENTS

| | | | |
|---|---|---|---|
| 2,014,019 A | 9/1935 | Girl | |
| 2,063,092 A | 12/1936 | Groden | |
| 2,091,069 A | 8/1937 | Girl | |
| 2,091,070 A | 8/1937 | Girl | |
| 2,091,071 A | 8/1937 | Girl | |
| 2,094,401 A | 9/1937 | Girl | |
| 2,140,615 A | 12/1938 | Biszantz | |
| 2,547,083 A | 4/1951 | Lundgren | |
| 2,792,137 A | 5/1957 | Solomon et al. | |
| 3,559,829 A | 2/1971 | Shamel | |
| 3,880,335 A * | 4/1975 | Winkler | 224/42.13 |
| 3,940,041 A | 2/1976 | Bott | |
| 4,072,258 A | 2/1978 | Cruson | |
| 4,093,088 A | 6/1978 | Hildebrandt et al. | |
| 4,230,246 A * | 10/1980 | Wilson | 224/42.21 |
| 4,312,620 A | 1/1982 | Muschalek, Jr. | |
| 4,418,852 A | 12/1983 | Grinwald | |
| 4,441,771 A * | 4/1984 | Roesler | 312/322 |
| 4,455,948 A | 6/1984 | Torres | |

(Continued)

OTHER PUBLICATIONS

David Michael Edwards, Copending U.S. Appl. No. 10/894,488, filed Jul. 20, 2004.

*Primary Examiner*—Nathan J Newhouse
*Assistant Examiner*—Justin M Larson
(74) *Attorney, Agent, or Firm*—Ulmer & Berne LLP (57) ABSTRACT

A support structure for a spare tire on a vehicle. A shell is attached to the vehicle and includes first and second end portions and a bottom portion extending at least partially between the first and second end portions. The shell at least partially defines a spare tire storage chamber and includes an opening providing access to the storage chamber, wherein the opening is adjacent to the first end portion. The support member is slidably positioned above the bottom portion and is movable back and forth along a movement path from a first position in which the support member is substantially disposed within the shell and a second position in which the support member is at least partially disposed outside the shell. In certain embodiments, a retention member can be fixedly attached to the shell. In further embodiments, the support member and the shell have a cooperative locking configuration.

25 Claims, 6 Drawing Sheets

U.S. PATENT DOCUMENTS

| | | | |
|---|---|---|---|
| 4,632,288 A | 12/1986 | Bullock | |
| 4,676,415 A * | 6/1987 | Kennedy | 224/489 |
| 4,711,382 A | 12/1987 | Helterbrand | |
| 4,736,689 A * | 4/1988 | Stanko | 108/5 |
| 4,795,302 A | 1/1989 | Dalton | |
| 4,884,729 A | 12/1989 | Barkouskie | |
| 4,976,384 A * | 12/1990 | Daniels | 224/42.23 |
| 5,026,107 A | 6/1991 | Hess | |
| 5,065,920 A * | 11/1991 | Amner | 224/275 |
| 5,222,640 A * | 6/1993 | Teson | 224/403 |
| 5,238,358 A * | 8/1993 | Higgins et al. | 414/463 |
| 5,484,198 A * | 1/1996 | Pilliod | 312/334.18 |
| D377,470 S * | 1/1997 | Santangelo | D12/202 |
| 5,860,786 A | 1/1999 | Aubrecht | |
| 5,951,232 A | 9/1999 | Yu et al. | |
| 5,957,346 A | 9/1999 | Schambre et al. | |
| 5,993,133 A | 11/1999 | Murray et al. | |
| 6,053,690 A * | 4/2000 | Hanson | 414/463 |
| 6,155,625 A * | 12/2000 | Felix | 296/37.14 |
| 6,279,793 B1 * | 8/2001 | Treis | 224/42.23 |
| 6,308,873 B1 * | 10/2001 | Baldas et al. | 224/281 |
| 6,422,567 B1 | 7/2002 | Mastrangelo et al. | |
| 6,474,715 B2 * | 11/2002 | Fukushima et al. | 296/37.1 |
| 6,516,983 B2 | 2/2003 | Sotiroff et al. | |
| 6,546,598 B1 * | 4/2003 | Nakanou et al. | 224/281 |
| 6,880,875 B2 * | 4/2005 | McClure et al. | 296/37.14 |
| 6,883,851 B2 * | 4/2005 | McClure et al. | 296/37.14 |
| 6,926,348 B2 * | 8/2005 | Krueger et al. | 296/184.1 |
| 2001/0052712 A1 * | 12/2001 | Fukushima et al. | 296/3 |
| 2004/0105744 A1 * | 6/2004 | Warner et al. | 414/522 |
| 2005/0236860 A1 * | 10/2005 | Nagamoto et al. | 296/37.14 |

* cited by examiner

SUPPORT STRUCTURE FOR A SPARE TIRE ON A VEHICLE

TECHNICAL FIELD

The present invention relates to a support structure for a spare tire on a vehicle. More particularly, the support structure can be configured to support a spare tire in a storage location disposed beneath the cargo carrying floor of a pickup truck.

BACKGROUND OF THE INVENTION

Conventionally, spare tires have created design and storage problems in many vehicles, including pickup trucks. A spare tire for a pickup truck is typically hung underneath the pickup truck in a position below the truck bed. In order to access this spare tire, an operator of the pickup truck must typically crawl at least partially beneath the pickup truck in order to remove fasteners used to secure the spare tire to the pickup truck. It is accordingly difficult and messy to access such a spare tire. Furthermore, this conventional spare tire storage arrangement typically renders the spare tire subject to theft and/or environmental damage.

As one alternative, the spare tire can be placed upon the bed floor of a truck bed for storage. Although such storage would facilitate relatively convenient access to the spare tire by an operator, storage space for other cargo upon the bed floor would be considerably diminished. Furthermore, unless a truck cap or other protective device is associated with the truck bed, the spare tire would not likely be protected from theft and/or environmental damage.

Accordingly, there is a need for a spare tire storage arrangement on a vehicle (e.g., a pickup truck) that substantially protects the spare tire from theft and from environmental elements without reducing the storage capacity of the vehicle, and that facilitates simple and clean access to the spare tire by an operator of the vehicle.

SUMMARY OF THE INVENTION

Accordingly, it is an aspect of the present invention to provide a spare tire storage arrangement on a vehicle that substantially protects the spare tire from theft and from environmental elements without reducing the storage capacity of the vehicle, and that facilitates simple and clean access to the spare tire by an operator of the vehicle.

To achieve the foregoing and other aspects, and in accordance with the purposes of the present invention defined herein, a vehicle having a support structure for a spare tire is provided. A shell is attached to the vehicle and includes first and second end portions and a bottom portion extending at least partially between the first and second end portions. The shell at least partially defines a spare tire storage chamber and includes an opening providing access to the storage chamber, wherein the opening is adjacent to the first end portion. A support member is adapted to support a spare tire. The support member is slidably positioned above the bottom portion and is movable back and forth along a movement path from a first position in which the support member is substantially disposed within the shell and a second position in which the support member is at least partially disposed outside the shell. The support member includes a lower interface surface for directly contacting an upper interface surface of the bottom portion of the shell in sliding engagement as the support member is moved along the movement path. A retention member is fixedly attached to the shell. The retention member permits sliding movement of the support member along the movement path with respect to the shell, and is operative to limit movement of the support member with respect to the shell in at least one direction substantially perpendicular to the movement path.

In another exemplary embodiment of the present invention, a vehicle having a support structure for a spare tire is provided. A shell is attached to the vehicle and includes first and second end portions and a bottom portion extending at least partially between the first and second end portions. The shell at least partially defines a spare tire storage chamber and includes an opening providing access to the storage chamber, wherein the opening is adjacent to the first end portion. A support member is adapted to support a spare tire. The support member is slidably positioned above the bottom portion and is movable back and forth along a movement path from a first position in which the support member is substantially disposed within the shell and a second position in which the support member is at least partially disposed outside the shell. The support member includes a lower interface surface for directly contacting an upper interface surface of the bottom portion of the shell in sliding engagement as the support member is moved along the movement path. The support member and the shell have a cooperative locking configuration for substantially inhibiting sliding movement of the support member relative to the shell along the movement path when the support member is selectively positioned relative to the shell.

In yet another exemplary embodiment of the present invention, a support structure adapted to support a spare tire for a vehicle is provided. The support structure includes a shell including at least one side portion extending at least partially between first and second end portions of the shell. The shell further includes a bottom portion extending at least partially between the first and second end portions. The shell at least partially defines a spare tire storage chamber and further defines an opening providing access to the storage chamber. The opening is adjacent to the first end portion. A support member is adapted to support a spare tire. The support member is slidably positioned above the bottom portion and is movable back and forth along a movement path from a first position in which the support member is substantially disposed within the shell and a second position in which the support member is at least partially disposed outside the shell. The support member includes a lower interface surface for directly contacting an upper interface surface of the bottom portion of the shell in sliding engagement as the support member is moved along the movement path. A retention member is fixedly attached to the shell. The retention member permits sliding movement of the support member along the movement path with respect to the shell, and is operative to limit movement of the support member with respect to the shell in at least one direction substantially perpendicular to the movement path. The support member and the shell have a cooperative locking configuration for substantially inhibiting sliding movement of the support member relative to the shell along the movement path when the support member is selectively positioned relative to the shell.

The vehicles and support structures described herein are advantageous for providing a spare tire storage arrangement on a vehicle that substantially protects a spare tire from theft and from environmental elements without reducing the storage capacity of the vehicle, and that facilitates simple and clean access to the spare tire by an operator of the vehicle. Additional aspects, advantages, and novel features of the invention will be set forth in part in the description that follows, and in part will become apparent to those skilled in the art upon examination of the following or may be learned with the practice of the invention. The aspects and advantages of the invention may be realized and attained by means of the instrumentalities and combinations particularly pointed out in the appended claims.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION OF EXEMPLARY EMBODIMENTS

Figure 1:
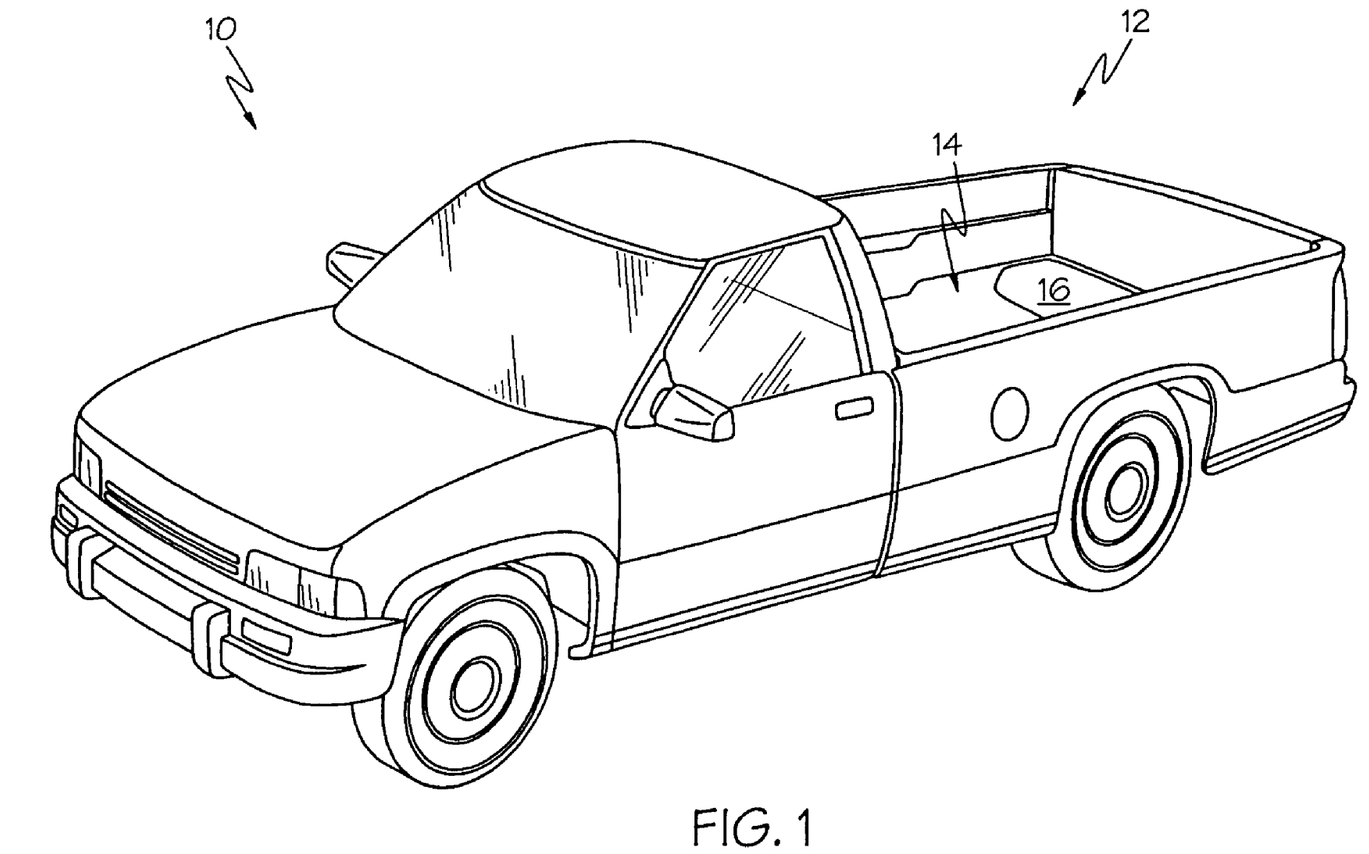
FIG. 1 is a perspective view depicting a pickup truck having a truck bed in accordance with one exemplary embodiment of the present invention.

Exemplary embodiments of the present invention and its operation are hereinafter described in detail in connection with the views and examples of FIGS. 1-3, 4A, 4B, 5A, 5B, 6A and 6B, wherein like numbers indicate the same or corresponding elements throughout the views. FIG. 1 depicts a vehicle, specifically a pickup truck 10, which can have a truck bed 12. The truck bed 12 can include a cargo carrying floor, and the cargo carrying floor can be substantially defined by a stationary bed floor 14 and a closure member 16.

Figure 2:
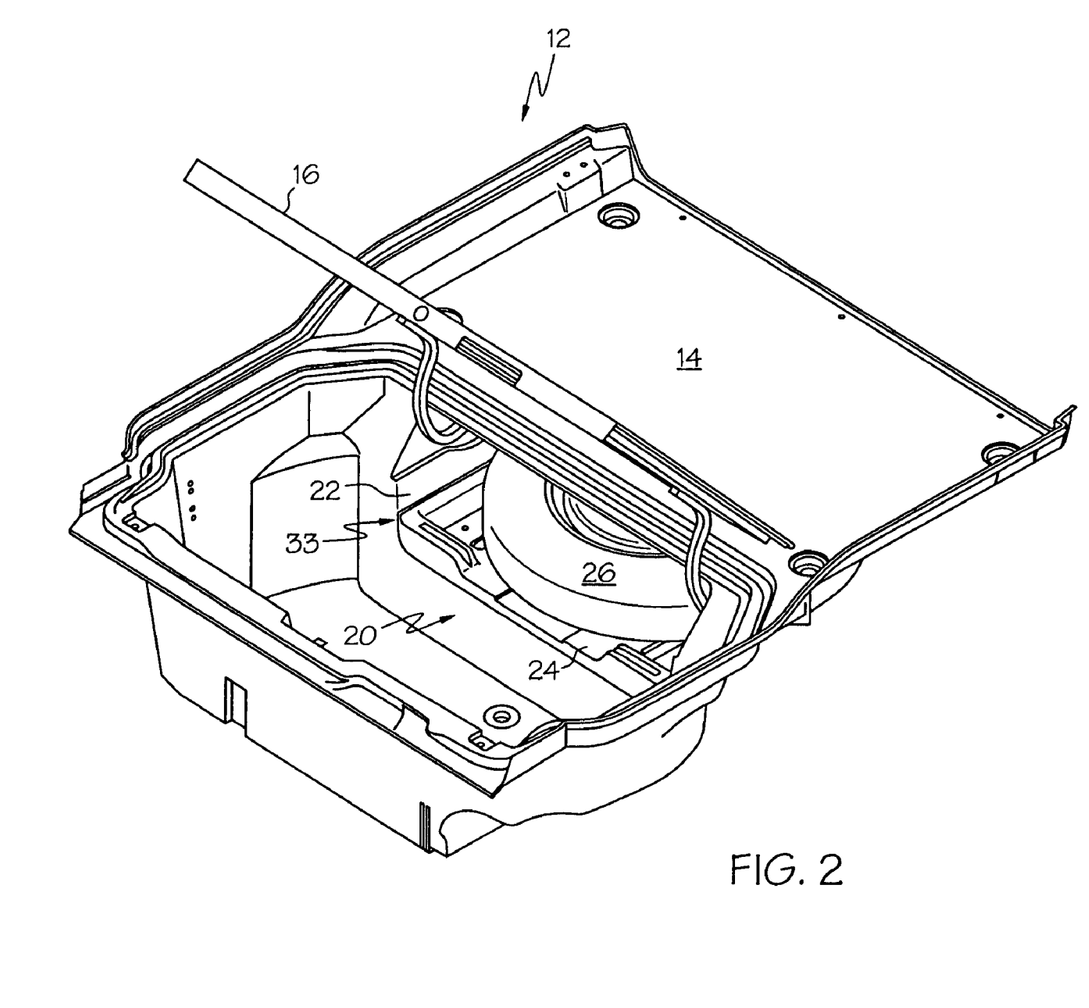
FIG. 2 is a perspective view depicting selected components of a truck bed having a support structure for a spare tire in accordance with one exemplary embodiment of the present invention.

FIG. 2 generally depicts selected components of the truck bed 12 of FIG. 1, and in particular depicts the closure member 16 in its opened position. A support structure 20 is shown to substantially underlie the cargo carrying floor of the pickup truck 10. The support structure 20 can be configured to support a spare tire 26 beneath the cargo carrying floor of the pickup truck 10. The spare tire 26, when so supported, can be protected from theft and/or damage from moisture and debris. The spare tire 26 can be accessed by the operator, for example, through the opening in the cargo carrying floor that is selectively covered by the closure member 16. It should of course be understood that alternate avenues might be provided for an operator to access a spare tire stored within an exemplary support structure.

Figure 3:
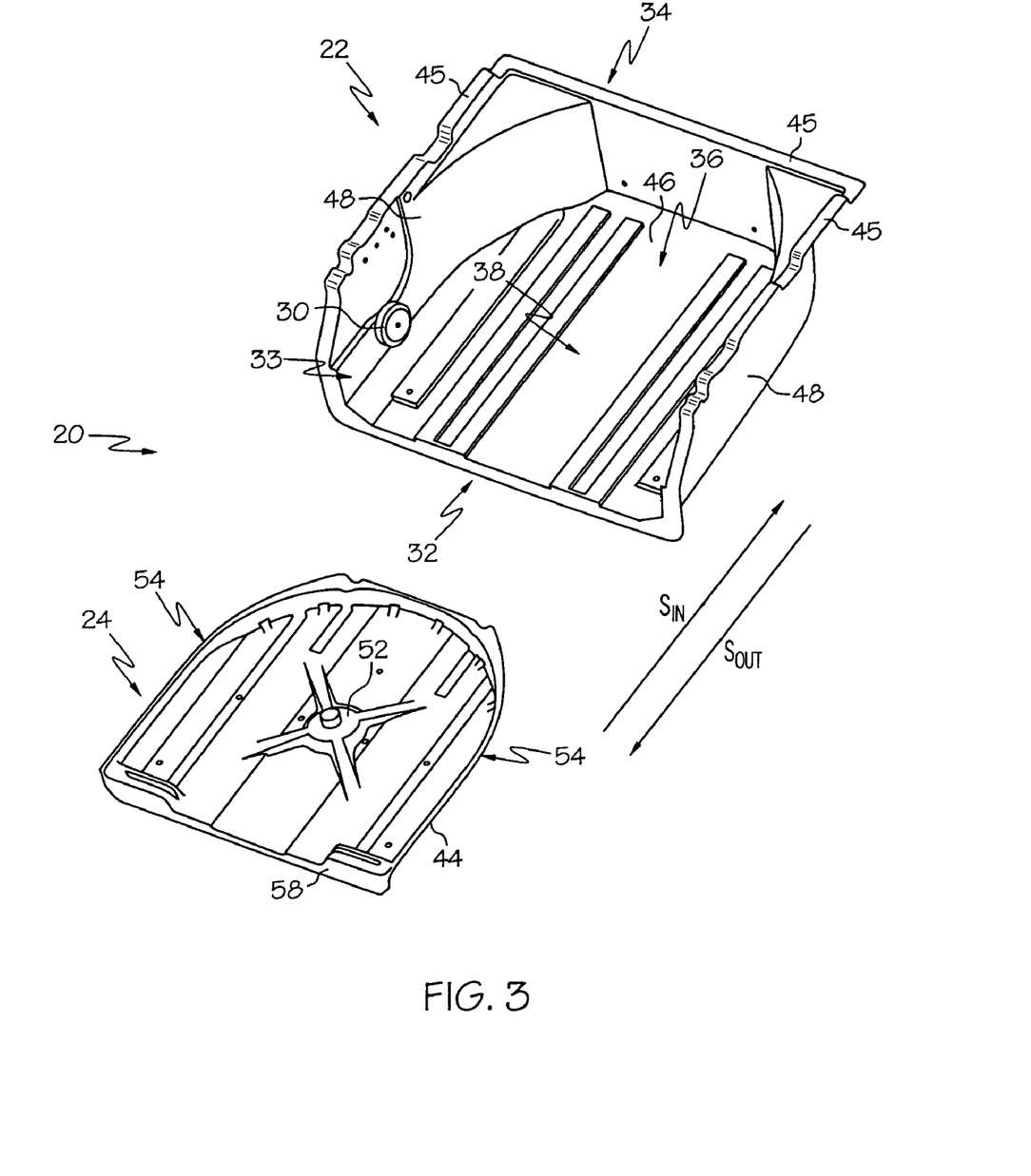
FIG. 3 is an exploded view depicting selected components of the support structure of FIG. 2.

FIG. 3 depicts an exploded view of the exemplary support structure 20. The support structure 20 is shown to comprise a shell 22, a support member 24 and a retention member 30. The shell 22 can be adapted for attachment to a vehicle and the support member 24 can be configured to support a spare tire with respect to the shell 22. A restraining member can be associated with the support member 24 for maintaining an associated spare tire in a fixed position with respect to the support member 24. Exemplary restraining members might include a hub 52 for matingly engaging the spare tire 26. Other exemplary restraining members might include a bolt, a strap, and/or a net.

The shell 22 can have a first end portion 32 and a second end portion 34 and can substantially define a spare tire storage chamber 38 disposed therebetween. The shell can further include at least one side portion 48 extending at least partially between the first and second end portions 32, 34. The shell can also include a bottom portion 36 extending at least partially between the first and second end portions 32, 34. In some embodiments, the bottom portion 36 can further extend at least partially between a plurality of side portions 48 (e.g., as in FIG. 3). The shell 22 can further include an opening 33 to the storage chamber 38, whereby the opening 33 can be adjacent to the first end portion 32 and can be dimensioned to facilitate the passage of a spare tire therethrough. In some embodiments, the second end portion 34 can assume an arcuate configuration corresponding to the curvature of the outer circumference of the spare tire 26, as shown for example in FIG. 3.

The shell 22 can be associated with a vehicle in any of a variety of specific configurations. In one exemplary embodiment, the shell 22 can be attached to the bed 12 of a pickup truck 10. For example, as depicted in FIG. 3, the shell 22 can include at least one upper edge portion 45 for engaging the underside of the bed floor 14. Fasteners, welds, adhesives, and/or a combination thereof can be used to secure the upper edge portion(s) 45 to the bed floor 14, and to thereby secure the shell 22 to the associated pickup truck 10. Additionally or alternatively, supports might be disposed beneath the bottom surface 36 of the shell 22 in order to provide subjacent support to the support structure 20, and to thereby maintain the shell 22 in close association with the bed floor 14.

The support member 24 can be slidably positioned above or on the bottom portion 36 and can be moveable (e.g., by sliding) back and forth along a movement path from a first position in which the support member 24 is substantially disposed within the shell 22 to a second position in which the support member 24 is at least partially disposed outside of the shell 22. The support member 24 travels in a first direction ($S_{IN}$) when moving from the second position into the first position, but then travels in a second direction ($S_{OUT}$) when moving from the first position into the second position. As depicted in FIG. 3, the first direction and the second direction are directly opposite one another, and together substantially define the movement path for the support member 24 with respect to the shell 22. In one exemplary embodiment, the movement path occurs along a plane that is substantially parallel with a plane defined by the bed floor 14 of the truck bed 12.

The support member 24 includes a lower interface surface 44 that can, in one exemplary embodiment, directly contact an upper interface surface 46 of the bottom portion 36 in sliding engagement as the support member 24 is moved (e.g., by sliding) along the movement path. The lower interface surface 44 of the support member 24 and the upper interface surface 46 of the bottom portion 36 can be substantially parallel as the support member 24 slidably engages the shell 22. It should be understood that the lower interface surface 44 and/or the upper interface surface 46 can include one or more coatings. These coatings can be provided to affect the friction between the directly contacting lower interface surface 44 and upper interface surface 46, for example. Exemplary coatings might include chemicals (e.g., lubricants), fabrics (e.g., felt), plastics, rubber, and/or any other material that might desirably affect the interaction between the directly contacting surfaces 44 and 46. For example, in one particular embodiment, the lower interface surface 44 can comprise a layer of plastic such that the layer and the upper interface surface 46 of the bottom portion 36 of the shell 22 are in direct contact as the support member 24 slidably engages the shell 22.

A retention member 30 can be associated with the shell and can be configured to directly engage one or more outer edges 54 of the support member 24 when the support member 24 is inserted into the shell 22. The retention member 30 can permit sliding movement of the support member 24 with respect to the shell 22 along the movement path. Additionally, the retention member 30 can be operative to limit movement of the support member 24 with respect to the shell 22 in at least one direction substantially perpendicular to the movement path (e.g., up/down and left/right).

Figure 4A:
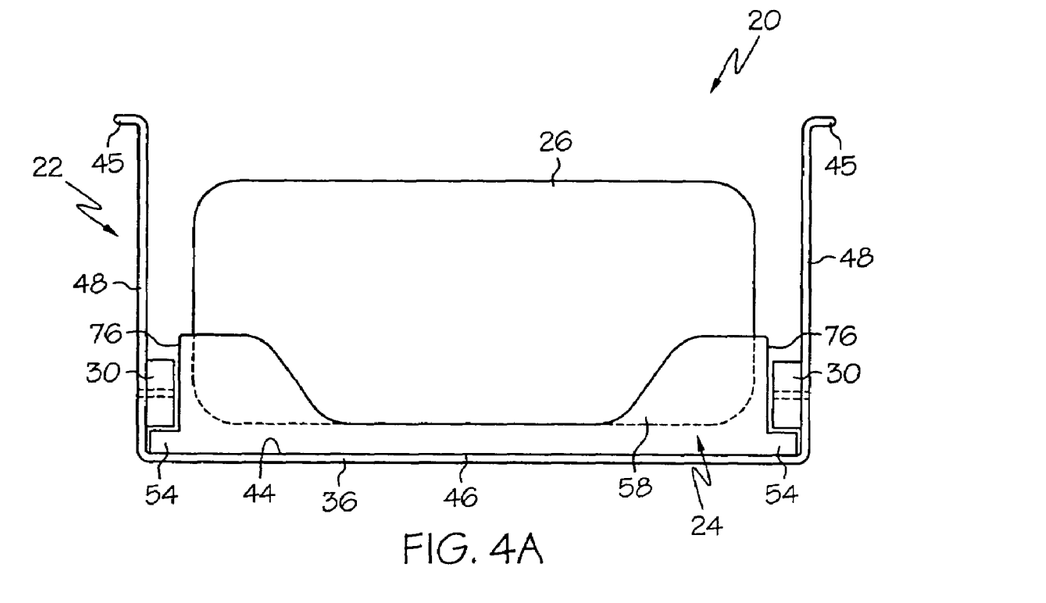
FIG. 4A is a front elevational view depicting an opening in an end portion of the support structure of FIGS. 2 and 3 in accordance with one exemplary embodiment of the present invention.

In one particular embodiment, as depicted by FIG. 3, the retention member can comprise a rotating member (e.g., a wheel 30) that is fastened with respect to the shell. FIG. 4A depicts an exemplary support structure 20 having a plurality of retention members (e.g., two wheels 30) that are fixedly attached to the shell 22 but are configured to rotate. Each of these wheels 30 is configured to interface a respective outer edge 54 of the support member 24. The outer edges 54 are depicted in FIG. 4A as extending outwardly and generally perpendicularly from the movement path, and being closely disposed to the retention members 30 when the support member 24 is in its first position. These interfaces between the retention members 30 and the outer edges 54 substantially prevents the support member 24 (e.g., when in its first position) from moving in a direction (e.g., up/down) substantially perpendicular to the movement path.

Also, the retention members 30 are depicted as being closely disposed to side surfaces 76 of the support member 24 when the support member 24 is in its first position. This relationship between the retention members 30 and the side surfaces 76 can substantially prevent the support member 24 (e.g., when in its first position) from moving in a direction (e.g., side/side) substantially perpendicular to the movement path. In another embodiment, the outer edges 54 of the support member 24 are depicted as being closely disposed to the side portions 48 of the shell 22 when the support member 24 is in its first position. This relationship between the outer edges 54 and the side portions 48 can additionally or alternatively substantially limit the support member 24 (when in its first position) from moving in a direction (e.g., side/side) substantially perpendicular to the movement path. FIG. 4A further illustrates a direct contact between the lower interface surface 44 of the support member 24 and the upper interface surface 46 of the bottom portion 36 of the shell 22.

Figure 4B:
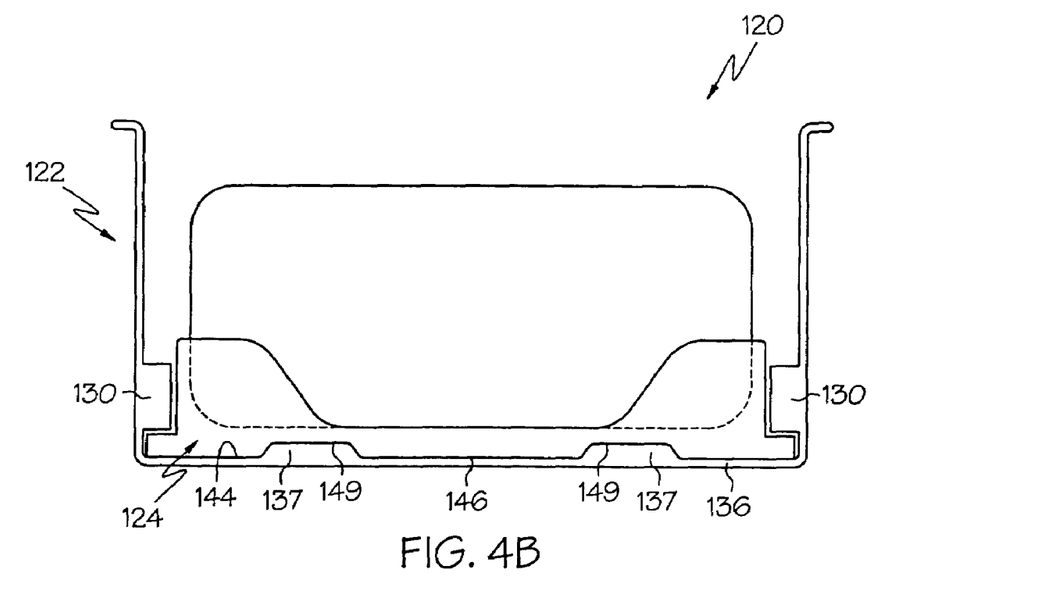
FIG. 4B is a front elevational view similar to FIG. 4A but depicting an alternative support structure in accordance with another exemplary embodiment of the present invention.

In another exemplary embodiment of the present invention, the retention member(s) 130 can be integrally formed with the shell 122, as illustrated for example in FIG. 4B. These integrated retention members 130 permit movement of the support member 124 with respect to the shell 122 along the movement path, but substantially limit movement of the support member 124 in at least one direction substantially perpendicular to the movement path (e.g., as described above with respect to the retention members 30 of FIG. 4A). FIG. 4B further illustrates a direct contact between the lower interface surface 144 of the support member 124 and the upper interface surface 146 of the bottom portion 136 of the shell 122.

One of the bottom portion and the support member of an exemplary support structure (e.g., 120) might include an outwardly projecting protrusion, and the other of the bottom portion and the support member might include a complementary inwardly extending recess adapted to receive the protrusion. For example, as depicted in FIG. 4B, the bottom portion 136 of the shell 122 can include one or more upwardly extending protrusions (e.g., 137). The lower interface surface 144 of the support member 124 can include one or more grooves (e.g., 149) for correspondingly engaging the protrusion(s). Each protrusion (e.g., 137) and groove (e.g., 149) can remain in close proximity or in direct contact as the support member 124 slides with respect to the shell 122. It should be understood that in alternate embodiments, one or more protrusions in the support member 124 could correspondingly engage one or more grooves in the shell 122. It should be further understood that virtually any quantity and virtually any configuration of correspondingly engaging protrusion/groove pairs could be provided in association with an exemplary support structure. In general, correspondingly engaging protrusion/groove pairs can assist in limiting a support member (when in its first position) from moving in a direction (e.g., side/side) substantially perpendicular to the movement path.

Figure 5A:
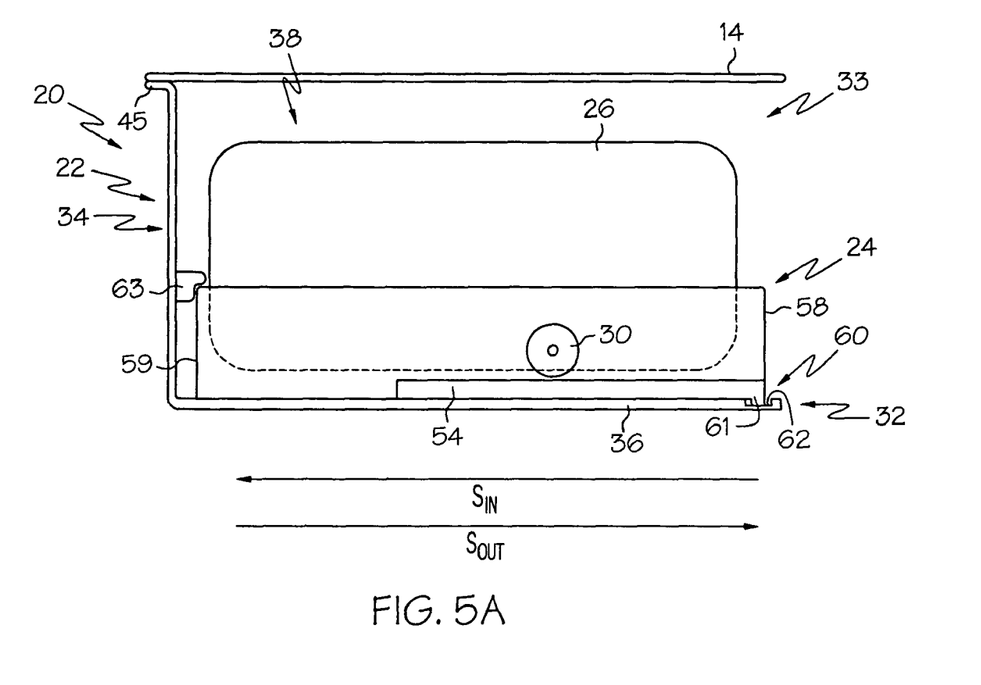
FIG. 5A is a side elevational view, partially in cross-section, depicting a support structure in accordance with still another exemplary embodiment of the present invention.

The support member and the shell can be provided with one or more cooperative locking configurations for substantially inhibiting sliding movement of the support member relative to the shell along the movement path when the support member is selectively positioned relative to the shell. In one particular exemplary embodiment, a cooperative locking configuration includes a complementary geometry. FIG. 5A illustrates one exemplary embodiment of a complementary geometry 60, wherein the support member 24 comprises a flange 61 that is configured to selectively engage a recessed region 62 in the bottom portion 36 of the shell 22. When so engaged, the support member 24 can be substantially prevented from sliding along the movement path. The flange 61 is depicted as being integrally formed in the support member 24 adjacent to a front edge 58 of the support member 24 and the recessed region 62 is depicted as being integrally formed in the bottom portion 36 adjacent to the first end portion 32 of the shell. However, it should be understood that alternate embodiments of an exemplary support structure can involve a flange and a recessed region that are not adjacent to the front edge 58 and the first end portion 32. Furthermore, it is appreciated that an exemplary support structure might include one or more complementary geometries (e.g., having a plurality of flanges and/or recessed regions). In use, a support structure located at its first position can be substantially prevented from movement along the movement path by component(s) forming a cooperative locking configuration. To disengage the complementary geometry 60 of FIG. 5A, an operator can lift the front edge 58 of the support member 24 to thereby disengage the flange 61 from the recessed region 62, and to thereby permit movement of the support member 24 along the movement path.

Figure 5B:
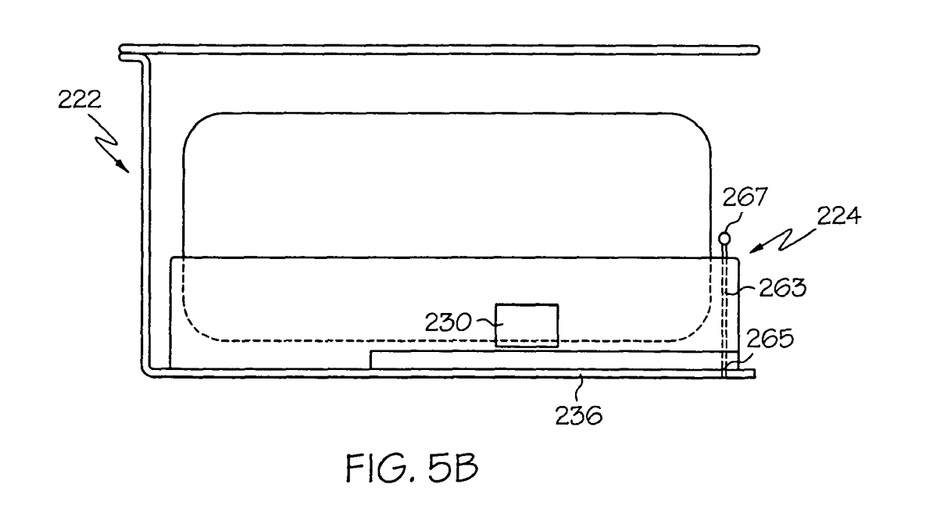
FIG. 5B is a side elevational view, partially in cross-section, depicting a support structure in accordance with yet another exemplary embodiment of the present invention.

In another exemplary embodiment, as illustrated in FIG. 5B, the cooperative locking configuration can include an aligned arrangement that is configured to limit movement of the support member 224 relative to the shell 222 along the movement path. The aligned arrangement can include an aperture 263 in the support member 224 that aligns with an aperture 265 in the shell 222 when the support member 224 is in the first position. A locking member 267, such as a pin and/or a rod, can be inserted through the aligned apertures 263, 265 to thereby substantially inhibit sliding movement of the support member 224 relative to the shell 222 (e.g., along the movement path). In order for an operator to remove the support member 224 from the shell 222, the locking member 267 may be removed and the support member 224 can then be slid out of the shell 222 along the movement path. Although FIG. 5B illustrates the aligned apertures 263, 265 being configured to facilitate the passage of a vertically oriented locking member 267 through the bottom surface 236 of the shell 222, it should be understood that the aligned apertures can have alternative orientations and/or can involve portions of the shell 222 other than the bottom portion 236. Furthermore, any of a variety of alternative cooperative locking configurations (e.g., involving a flange, a hook or clip) could be associated with a support member and a shell of an exemplary support structure to selectively limit movement of the support member along the movement path. FIG. 5B also depicts a retention member 230 that can be integrally formed with the shell 222, such as is the retention member 130 depicted in FIG. 4B.

Figure 6A:
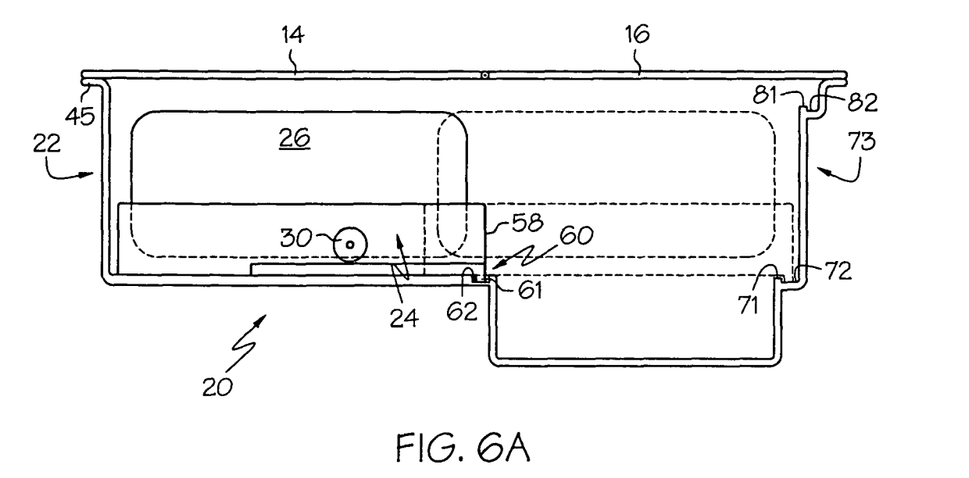
FIG. 6A is a side elevational view, partially in cross-section, of a cargo carrying system including the support structure of FIG. 5A.
Figure 6B:
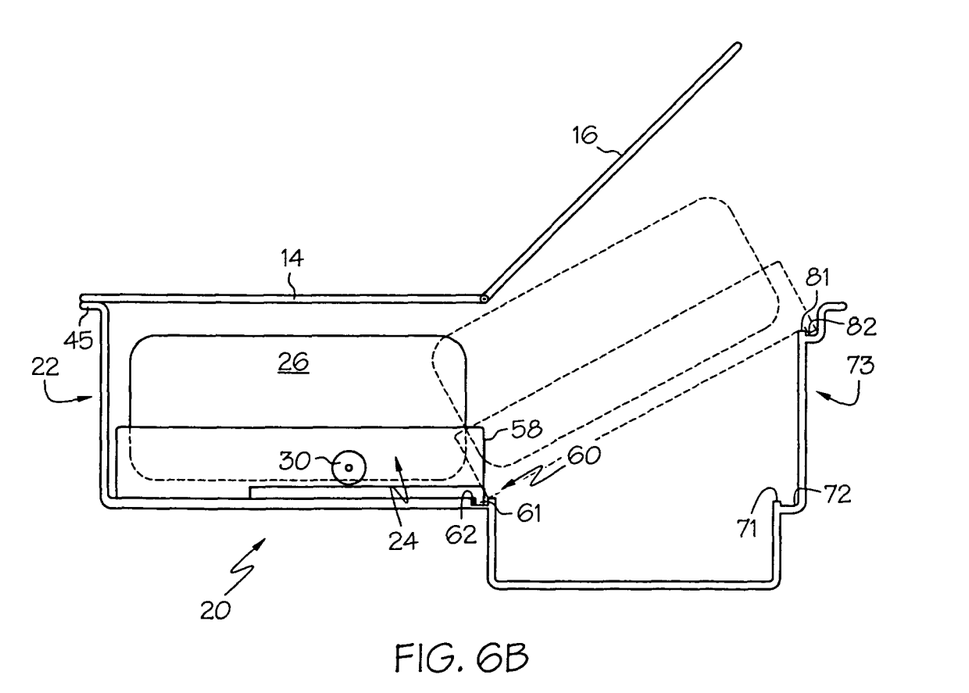
FIG. 6B is another side elevational view, partially in cross-section, of a cargo carrying system including the support structure of FIG. 5A.

FIG. 6A and 6B depict cargo carrying systems involving exemplary support structures in use. In each of FIGS. 6A and 6B, a support structure 20 is shown as being associated with a bed floor 14 and a closure member 16 of a truck bed. A user can disengage the cooperative locking configuration 60 by slightly lifting the front edge 58 of the support member 24 which accordingly removes the flange 61 from the recessed region 62 to permit movement of the support member 24 along the movement path. Although the retention member(s) (e.g., 30) can generally prevent up/down movement of the support member while the support member is in its first position, it is to be understood that sufficient vertical movement of the support member 24 shall be permitted by the retention member(s) if necessary to enable an operator to disengage the flange 61 from the recessed region 62.

Once the support member 24 is extended from the shell 22 through the opening in the first end portion, the support member 24 can be supported by various mechanisms while the operator removes or adds the spare tire 26 to the support member 24. For example, FIG. 6A illustrates in dashed lines how the support member 24 can be extended to a second position. The support member 24 can be supported along its front edge 58 by a ledge 71 defined by a shell 73 that is depicted as being associated with the shell 22. Movement of the support member 24 along the movement path can be substantially prevented by causing the flange 61 to engage a recessed region 72 in the ledge 71. An operator can then return the support member 24 to its first position by lifting the front edge 58 such that the flange 61 is removed from the recessed region 72, and by then sliding the support member 24 back into the shell 22. The support member 24 can then lock into the shell 22 when the flange 61 engages the recessed region 62.

As another example, FIG. 6B illustrates in dashed lines how the support member 24 can be extended to a third position. After the support member 24 is moved from the first position to the second position (e.g., shown in dashed lines in FIG. 6A), the front edge 58 of the support member can be lifted vertically and can be supported upon a ledge 81 defined by the shell 73. The support member 24 can be prevented from falling by engaging the flange 61 with a recessed region 82 in the ledge 81. An operator can then return the support member 24 to its first position by lifting the front edge 58 such that the flange 61 is removed from the recessed region 82, by lowering the front edge 58, and then by sliding the support member 24 back into the shell 22. The support member 24 can then lock into the shell 22 when the flange 61 engages the recessed region 62. Although flange/recess configurations are depicted in FIGS. 6A and 6B for securing the support member in its second and third positions, it should be understood that alternate cooperative locking configurations (e.g., an aligned aperture arrangement, a hook, a clasp) might be provided to inhibit sliding movement of the support member when the support member is removed from its first position (e.g., as when placed into one of the second or third positions). In still another exemplary embodiment, the support member 24 can be cantileverly supported by the shell 22 such that the front edge 58 is substantially unsupported by any ledge during removal of the spare tire 26 by an operator.

As depicted by FIG. 5A, a stopper 63 can be attached to the shell 22 (e.g., disposed adjacent to the second end portion 34) and can be configured to engage the support member 24 in order to prevent overtravel along the movement path by the support member 24 and/or to retain a rear edge 59 of the support member 24. It is important to note that the components of an exemplary support structure can be formed from various materials known and appreciated by those skilled in the art. For example, the materials could include metals, alloys, plastics, composites or combinations thereof. Also, although the specific embodiments discussed herein primarily relate to the use of an exemplary support structure in conjunction with a pickup truck, it should be understood that a support structure in accordance with the present invention can also be associated with other types of motor vehicles and non-motor vehicles, including but not limited to cars, sport-utility vehicles, recreational vehicles, construction equipment, trailers, campers, and a variety of other vehicles.

The foregoing description of exemplary embodiments and examples of the invention has been presented for purposes of illustration and description. It is not intended to be exhaustive or limit the invention to the forms described. Numerous modifications are possible in light of the above teachings. Some of those modifications have been discussed, and others will be understood by those skilled in the art. The embodiments were chosen and described in order to best illustrate the principles of the invention and various embodiments as are suited to the particular use contemplated. It is hereby intended that the scope of the invention be defined by the claims appended hereto.

What is claimed is:

1. A vehicle comprising:
   a first shell at least partially defining a spare tire storage chamber, an opening providing access to the spare tire storage chamber, and a first recess adjacent to the opening;
   a second shell adjacent to the first shell and defining a second recess and a third recess; and
   a support member adapted to support a spare tire and comprising a flange, the support member being movable with respect to the first shell among a first position in which the flange complementarily engages the first recess, a second position in which the flange complementarily engages the second recess, and a third position in which the flange complementarily engages the third recess.

2. The vehicle of claim 1 being a pickup truck and further comprising a truck bed, the truck bed having a cargo-carrying floor, and the first shell and the second shell underlying the cargo carrying floor.

3. The vehicle of claim 1 further comprising a locking member configured for selective insertion into aligned apertures in the first shell and the support member when the support member is at the first position, wherein the locking member upon said insertion is configured to inhibit sliding movement of the support member relative to the first shell.

4. The vehicle of claim 3 wherein the locking member comprises at least one of a pin and a rod.

5. The vehicle of claim 1 wherein the support member, when in the first position, is substantially disposed within the first shell and, wherein the support member, when in each of the second position and the third position, is at least partially disposed outside of the first shell and is at least partially disposed inside of the second shell.

6. The vehicle of claim 5 wherein the first shell includes first and second end portions and a bottom portion extending at least partially between the first and second end portions, the opening is adjacent to the first end portion, the bottom portion defines the first recess adjacent to the first end portion, the second shell extends outwardly from the first shell and to a distal end, and the second shell defines the second recess and the third recess adjacent to the distal end.

7. The vehicle of claim 6 wherein the second end portion of the first shell has an arcuate configuration corresponding to the curvature of the outer circumference of a spare tire.

8. The vehicle of claim 6 wherein the support member is slidably positioned above the bottom portion and is movable back and forth along a movement path, and wherein the support member includes a lower interface surface configured to directly contact an upper interface surface of the bottom portion of the first shell in sliding engagement as the support member moves along the movement path.

9. The vehicle of claim 8 wherein the lower interface surface of the support member is parallel with the upper interface surface of the bottom portion of the first shell when the support member is in each of the first position and the second position, and wherein the lower interface surface of the support member is inclined with respect to the upper interface surface of the bottom portion of the first shell when the support member is in the third position.

10. The vehicle of claim 8 wherein the vehicle further comprises a retention member fixedly attached to the first shell, the retention member configured to selectively interface a side portion of the support member and to permit sliding movement of the support member along the movement with respect to the first shell, and being operative to limit movement of the support member with respect to the first shell in at least one direction substantially perpendicular to the movement path.

11. The vehicle of claim 10 wherein the retention member comprises at least one wheel.

12. The vehicle of claim 11 wherein said wheel is rotatably attached to the first shell and cooperates with the bottom portion of the first shell to therebetween receive a side section of the support member such that the wheel contacts the side section when the support member is at the first position for limiting movement of the support member with respect to the first shell in at least one direction substantially perpendicular to the movement path.

13. A vehicle having a support structure for a spare tire, the vehicle comprising:
a first shell, the first shell including first and second end portions and a bottom portion extending at least partially between the first and second end portions, the first shell at least partially defining a spare tire storage chamber and including an opening providing access to the spare tire storage chamber, the opening being adjacent to the first end portion, and the bottom portion defining a first recess adjacent to the first end portion;
a second shell extending outwardly from the first shell and to a distal end, the second shell defining a second recess adjacent to the distal end; and
a support member adapted to support a spare tire, the support member being slidably positioned above the bottom portion and movable back and forth along a movement path from a first position in which the support member is substantially disposed within the first shell and a second position in which the support member is at least partially disposed outside the first shell and disposed at least partially inside the second shell, the support member including a lower interface surface configured to directly contact an upper interface surface of the bottom portion of the shell in sliding engagement as the support member is moved along the movement path, and a portion of the lower interface surface defining a flange; and
a locking member;
wherein the flange is configured to selectively engage the first recess in the bottom portion of the first shell for substantially inhibiting sliding movement of the support member relative to the first shell along the movement path when the support member is at the first position, the flange is further configured to selectively engage the second recess in the second shell for substantially inhibiting sliding movement of the support member relative to the first shell along the movement path when the support member is at the second position, the first shell and the support member define respective apertures which are aligned when the support member is at the first position, and the locking member is configured for selective insertion into the aligned apertures to inhibit sliding movement of the support member relative to the first shell.

14. The vehicle of claim 13 wherein the locking member comprises at least one of a pin and a rod.

15. A pickup truck comprising:
a truck bed having a cargo carrying floor;
a support structure underlying the cargo carrying floor, the support structure comprising:
a first shell at least partially defining a spare tire storage chamber, an opening providing access to the spare tire storage chamber, and a first recess adjacent to the opening; and
a second shell adjacent to the first shell and defining a second recess and a third recess; and
a support member adapted to support a spare tire and comprising a flange, the support member being movable with respect to the first shell among a first position in which the flange engages the first recess, a second position in which the flange engages the second recess, and a third position in which the flange engages the third recess.

16. The pickup truck of claim 15 further comprising a locking member configured for selective insertion into aligned apertures in the first shell and the support member when the support member is at the first position, wherein the locking member upon said insertion is configured to inhibit sliding movement of the support member relative to the first shell.

17. The pickup truck of claim 16 wherein the locking member comprises at least one of a pin and a rod.

18. The pickup truck of claim 15 wherein the support member, when in the first position, is substantially disposed within the first shell and, wherein the support member, when in each of the second position and the third position, is at least partially disposed outside of the first shell and is at least partially disposed inside of the second shell.

19. The pickup truck of claim 18 wherein the first shell includes first and second end portions and a bottom portion extending at least partially between the first and second end portions, the opening is adjacent to the first end portion, the bottom portion defines the first recess adjacent to the first end portion, the second shell extends outwardly from the first shell and to a distal end, and the second shell defines the second recess and the third recess adjacent to the distal end.

20. The vehicle of claim 19 wherein the second end portion of the first shell has an arcuate configuration corresponding to the curvature of the outer circumference of a spare tire.

21. The pickup truck of claim 19 wherein the support member is slidably positioned above the bottom portion and is movable back and forth along a movement path, the support member includes a lower interface surface configured to directly contact an upper interface surface of the bottom portion of the first shell in sliding engagement as the support member moves along the movement path, and a portion of the lower interlace surface defines the flange.

22. The pickup truck of claim 21 wherein the lower interface surface of the support member is parallel with the upper interface surface of the bottom portion of the first shell when the support member is in each of the first position and the second position, and wherein the lower interface surface of the support member is inclined with respect to the upper interface surface of the bottom portion of the first shell when the support member is in the third position.

23. The pickup truck of claim 21 wherein the vehicle further comprises a retention member fixedly attached to the first shell, the retention member configured to selectively interface a side portion of the support member and to permit sliding movement of the support member along the movement path with respect to the first shell, and being operative to limit movement of the support member with respect to the first shell in at least one direction substantially perpendicular to the movement path.

24. The pickup truck of claim 23 wherein the retention member comprises at least one wheel.

25. The pickup truck of claim 24 wherein said wheel is rotatably attached to the first shell and cooperates with the bottom portion of the first shell to therebetween receive a side section of the support member such that the wheel contacts the side section when the support member is at the first position for limiting movement of the support member with respect to the first shell in at least one direction substantially perpendicular to the movement path.

* * * * *

UNITED STATES PATENT AND TRADEMARK OFFICE
CERTIFICATE OF CORRECTION

| | | |
|---|---|---|
| PATENT NO. | : 7,410,081 B2 | Page 1 of 1 |
| APPLICATION NO. | : 10/663889 | |
| DATED | : August 12, 2008 | |
| INVENTOR(S) | : Kerry Stephen McClure et al. | |

It is certified that error appears in the above-identified patent and that said Letters Patent is hereby corrected as shown below:

Claims, Column 9, line 46, CLAIM 10, insert --path-- between "movement" and "with".

Claims, Column 11, line 22, CLAIM 21, change "interlace" to --interface--.

Signed and Sealed this

Fourth Day of November, 2008

JON W. DUDAS
*Director of the United States Patent and Trademark Office*